United States Patent
Itoh

(10) Patent No.: US 7,916,182 B2
(45) Date of Patent: Mar. 29, 2011

(54) IMAGING DEVICE AND METHOD WHICH PERFORMS FACE RECOGNITION DURING A TIMER DELAY

(75) Inventor: Kei Itoh, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 663 days.

(21) Appl. No.: 11/947,498

(22) Filed: Nov. 29, 2007

(65) Prior Publication Data

US 2008/0122943 A1    May 29, 2008

(30) Foreign Application Priority Data

Nov. 29, 2006  (JP) .................................. 2006-321247

(51) Int. Cl.
*H04N 5/228* (2006.01)
(52) U.S. Cl. .................................... 348/222.1; 348/345
(58) Field of Classification Search ............. 348/208.14, 348/221.1, 222.1, 361, 363
See application file for complete search history.

(56) References Cited

U.S. PATENT DOCUMENTS

| 7,664,389 | B2* | 2/2010 | Kretz et al. .................... 396/263 |
| 2003/0185424 | A1* | 10/2003 | Sato et al. ...................... 382/118 |
| 2006/0028576 | A1* | 2/2006 | Ito ................................. 348/345 |
| 2006/0197845 | A1* | 9/2006 | Masaki ....................... 348/224.1 |
| 2007/0065134 | A1* | 3/2007 | Sugimoto ..................... 396/165 |
| 2007/0237513 | A1* | 10/2007 | Sugimoto et al. ............. 396/123 |
| 2008/0122939 | A1* | 5/2008 | Hirai ........................... 348/222.1 |
| 2010/0158491 | A1* | 6/2010 | Sugimoto ....................... 396/48 |

FOREIGN PATENT DOCUMENTS

| JP | 05-053186 | 3/1993 |
| JP | 08-006154 | 1/1996 |
| JP | 2004-336265 | 11/2004 |

* cited by examiner

*Primary Examiner* — Gevell Selby
(74) *Attorney, Agent, or Firm* — Oblon, Spivak, McClelland, Maier & Neustadt, L.L.P.

(57) ABSTRACT

An apparatus and method for capturing images using a delay timer and face detection. After a command is given to begin a photographing process, a face detector determines the location of a face of a person being photographed. A timer counts down a predetermined delay time, for example, corresponding to a self-timer time period. A controller can set the auto focus or auto exposure parameters based on the detected face.

19 Claims, 13 Drawing Sheets

MONITOR IMAGE IN CASE OF
SETTING SELF-TIMER MODE
(10 SECONDS MODE)

MONITOR IMAGE IN CASE OF
SETTING SELF-TIMER MODE
(2 SECONDS MODE)

MONITOR IMAGE IN CASE OF
SETTING REMOTE CONTROL MODE

NORMAL AF FRAME

AF AREA IN CASE OF
RECOGNIZING FACE

FIG. 6

| Y1 | Y2 | Y3 | Y4 | Y5 | Y6 | Y7 | Y8 | Y9 | Y10 | Y11 | Y12 | Y13 | Y14 | Y15 | Y16 |
|---|---|---|---|---|---|---|---|---|---|---|---|---|---|---|---|
| Y17 | Y18 | Y19 | Y20 | Y21 | Y22 | Y23 | Y24 | Y25 | Y26 | Y27 | Y28 | Y29 | Y30 | Y31 | Y32 |
| Y33 | Y34 | Y35 | Y36 | Y37 | Y38 | Y39 | Y40 | Y41 | Y42 | Y43 | Y44 | Y45 | Y46 | Y47 | Y48 |
| Y49 | Y50 | Y51 | Y52 | Y53 | Y54 | Y55 | Y56 | Y57 | Y58 | Y59 | Y60 | Y61 | Y62 | Y63 | Y64 |
| Y65 | Y66 | Y67 | Y68 | Y69 | Y70 | Y71 | Y72 | Y73 | Y74 | Y75 | Y76 | Y77 | Y78 | Y79 | Y80 |
| Y81 | Y82 | Y83 | Y84 | Y85 | Y86 | Y87 | Y88 | Y89 | Y90 | Y91 | Y92 | Y93 | Y94 | Y95 | Y96 |
| Y97 | Y98 | Y99 | Y100 | Y101 | Y102 | Y103 | Y104 | Y105 | Y106 | Y107 | Y108 | Y109 | Y110 | Y111 | Y112 |
| Y113 | Y114 | Y115 | Y116 | Y117 | Y118 | Y119 | Y120 | Y121 | Y122 | Y123 | Y124 | Y125 | Y126 | Y127 | Y128 |
| Y129 | Y130 | Y131 | Y132 | Y133 | Y134 | Y135 | Y136 | Y137 | Y138 | Y139 | Y140 | Y141 | Y142 | Y143 | Y144 |
| Y145 | Y146 | Y147 | Y148 | Y149 | Y150 | Y151 | Y152 | Y153 | Y154 | Y155 | Y156 | Y157 | Y158 | Y159 | Y160 |
| Y161 | Y162 | Y163 | Y164 | Y165 | Y166 | Y167 | Y168 | Y169 | Y170 | Y171 | Y172 | Y173 | Y174 | Y175 | Y176 |
| Y177 | Y178 | Y179 | Y180 | Y181 | Y182 | Y183 | Y184 | Y185 | Y186 | Y187 | Y188 | Y189 | Y190 | Y191 | Y192 |
| Y193 | Y194 | Y195 | Y196 | Y197 | Y198 | Y199 | Y200 | Y201 | Y202 | Y203 | Y204 | Y205 | Y206 | Y207 | Y208 |
| Y209 | Y210 | Y211 | Y212 | Y213 | Y214 | Y215 | Y216 | Y217 | Y218 | Y219 | Y220 | Y221 | Y222 | Y223 | Y224 |
| Y225 | Y226 | Y227 | Y228 | Y229 | Y230 | Y231 | Y232 | Y233 | Y234 | Y235 | Y236 | Y237 | Y238 | Y239 | Y240 |
| Y241 | Y242 | Y243 | Y244 | Y245 | Y246 | Y247 | Y248 | Y249 | Y250 | Y251 | Y252 | Y253 | Y254 | Y255 | Y256 |

FIG. 7

IN CASE THAT OBJECT IS A PLENTY OF PEOPLE

IN CASE THAT OBJECT IS
A PLENTY OF PEOPLE

ANGLE OF FIELD FOR PHOTOGRAPHING

ZOOMING AND RECOGNIZING FACE AGAIN

SET BACK TO PREVIOUS ANGLE OF FIELD

IMAGING DEVICE AND METHOD WHICH PERFORMS FACE RECOGNITION DURING A TIMER DELAY

CROSS-REFERENCE TO RELATED APPLICATIONS

The present application claims the benefit of priority to Japanese Application No. 2006-321247, filed Nov. 29, 2006, the contents of which are incorporated herein by reference.

BACKGROUND OF THE INVENTION

1. Field of the Invention

The present invention relates to an image obtaining device such as a digital camera, and especially relates to when the settings of the image obtaining device are determined.

2. Discussion of the Background

A self-timer function, which imposes a delay for a predetermined time between an instruction of photographing and a time of photographing, is found on most cameras and permits the photographer to be in the picture. In the case of using the self-timer function, at first a self-timer mode is set on the camera and next a release button is pressed. In the above case, it is no problem that there are multiple subject persons such as in a group photo since a photographer can operate a self-timer photographing after the photographer focuses on any of subject persons other than the photographer. However in the case that the photographer take a photo of the only photographer itself, the photographer must focus on a position which the photographer will be in at a time of photographing, operate the self-timer function, and move to the position during a delay time. This has some problems, for example, whether the photographer can get to the desired position or not, whether there is an object for focusing on, and so on. As a result, the photographer may take a photo which has a lack of sharpness caused by the photographer that cannot get into position accurately, or there are no objects for focusing on instead of the photographer himself. In the case of the subject have no contrast or a recurrent pattern, it is difficult to focus on the subject.

Regarding a self-timer function, Japanese Laid-Open Patent Application No. 2004-336265 discloses that a number of subject people are registered on a camera and the camera take a photo at the time of detecting eyes for subject person. The camera prevent taking a failed photo such that the subject person look away, the subject person closes his eyes, and so on.

Japanese Laid-Open Patent Application No. H8-006154 discloses that a camera performs a distance determination during a delay time of the self-timer function. The operation does not need extra time because a releasing operation has a priority over the distance determination. Moreover, the camera has a focus priority mode and a release priority mode. However Japanese Laid-Open Patent Application No. H8-006154 does not disclose a technology for easily allowing the photographer takes a photo of himself. Further, Japanese Laid-Open Patent Application No. H8-006154 still has a problem that the camera fails to focus accurately in the case that there are cumbersome objects in the subject or there are no objects for focusing on instead of the photographer himself. Moreover, Japanese Laid-Open Patent Application No. H8-006154 has a problem that the camera cannot change a setting such as an automatic focus area and an automatic exposure area.

Further, Japanese Laid-Open Patent Application No. H5-053186 discloses that a camera flashes a light corresponding to photographing range. A photographer can recognize that he is in a photographable position when he sees a flashing light, even in the case that the photographer takes a photo of the photographer himself.

SUMMARY OF THE INVENTION

The present inventors recognized that the above-described background art suffers from taking a photo of a photographer itself.

Therefore, an object of the present invention is to provide a novel imaging pickup apparatus that simplifies a photographing operation having a delaying time such as a self-timer mode or remote control mode and gives good results.

There is an imaging apparatus, which may be a digital camera, for example which includes a face detector which detects a face of a person being photographed, a timer configured to delay a time an instruction is provided until an image is photographed, and a controller configured to operate the face detector during the time in which there is the delay and to change photographing parameters prior to photographing using a result of the face detector.

The invention further includes a method of capturing an image. According to the method, the method includes receiving an instruction to capture an image, running a timer which delays a start of the capture of the image, performing a face detection of a person being photographed while running the timer, setting an image capture parameter using a result of the face detection, and capturing the image after the delay caused by the timer using the image capture parameter which has been set.

BRIEF DESCRIPTION OF THE DRAWINGS

FIG. 6 shows a divided digital RGB area in the imaging pickup device;

Figure 7:
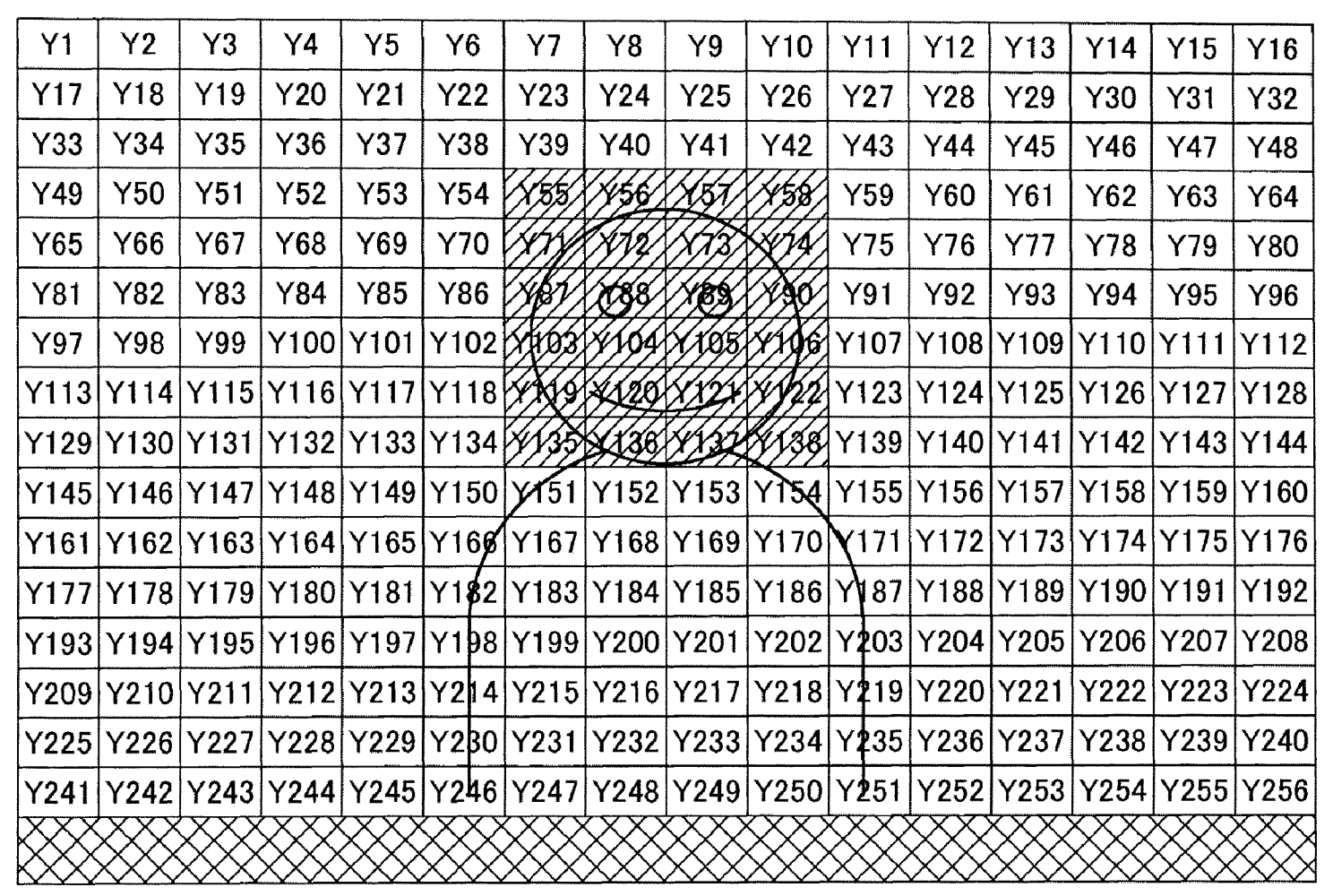

FIG. 7 shows a facial area setting in the divided digital RGB area when a facial recognition function is operated;

DETAILED DESCRIPTION OF THE PREFERRED EMBODIMENTS

Figure 1A:
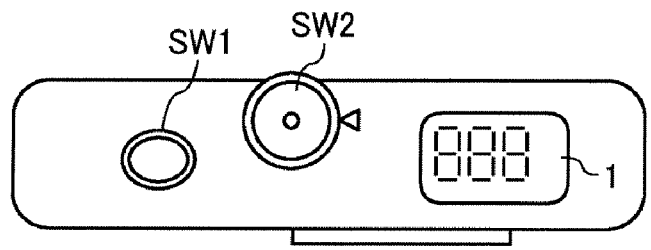
FIG. 1A is a top view of an imaging pickup device according to the present invention.
Figure 1B:
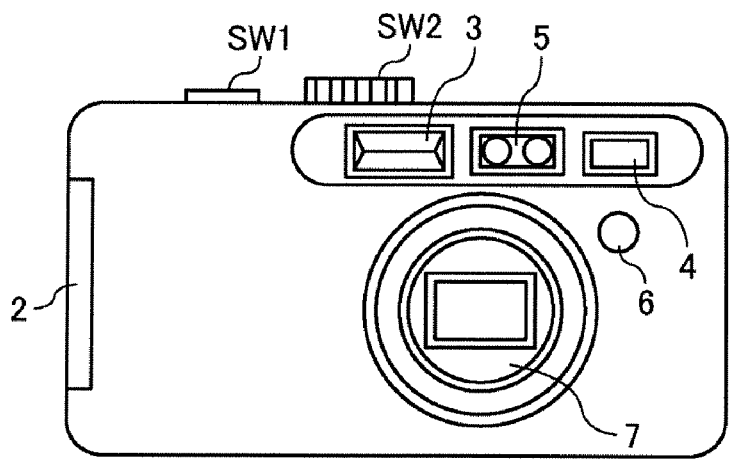
FIG. 1B is a front view of the imaging pickup device according to the present invention.
Figure 1C:
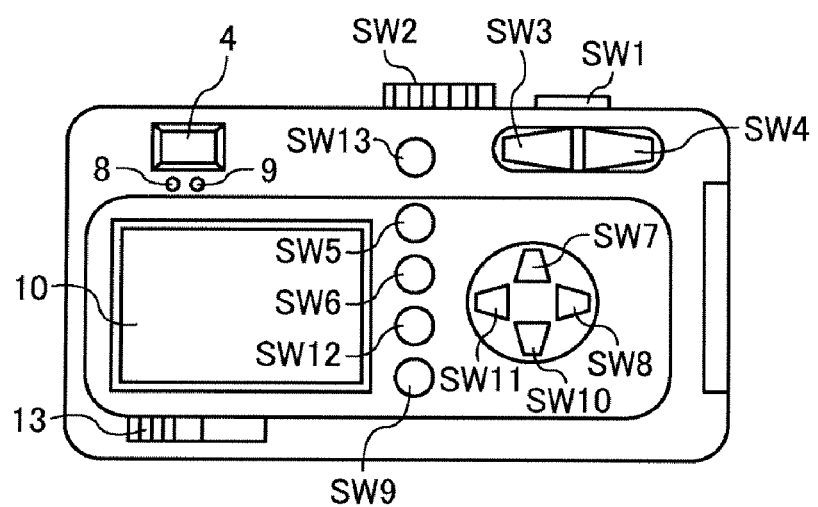
FIG. 1C is a back view of the imaging pickup device according to the present invention.
Figure 2:
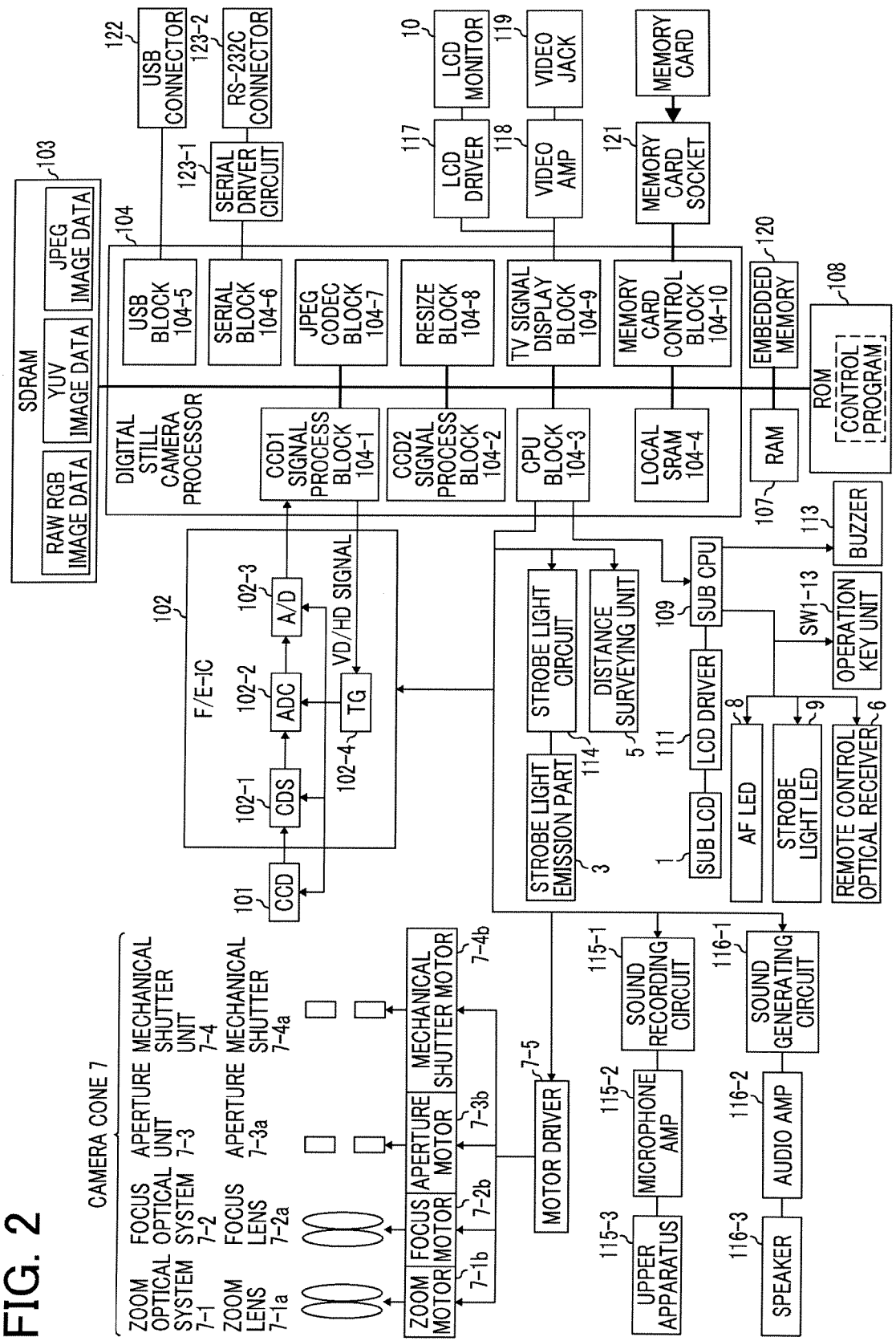
FIG. 2 is a block diagram showing a system configuration in the image pickup apparatus according to the present invention.

Referring now to the drawings where like reference numerals designate identical or corresponding parts throughout the several views and more particularly to FIG. 1 thereof, there is illustrated a digital camera according to a first embodiment of the present invention. FIG. 1A is a top view of the digital camera, FIG. 1B is a front view of the digital camera, and FIG. 1C is a back view of the digital camera. FIG. 2 is a block diagram showing a system configuration in the digital camera according to the first embodiment.

A top face of the digital camera includes a release switch SW1, a mode dial SW2, and a liquid crystal display 1 (hereinafter called LCD) shown in FIG. 1A. A front face of the digital camera includes a camera cone 7, an optical finder 4, a strobe light emission part or flash 3, a distance surveying unit or range finder 5, a remote control receiver 6 may be implemented as an infrared receiver, an ultrasonic receiver, or a radio frequency receiver, for example which receives a command to take a picture and/or begin a delay timer, for example, for two seconds prior to taking a picture. There is also a battery loading part 2 and a cap of the battery loading part 2 shown in FIG. 1B.

In FIG. 1C, there is shown a back face of the digital camera which includes a power switch 13, a LCD monitor 10, an AF LED 8, a strobe light LED 9, the optical finder 4, a wide-angle direction zoom switch SW3, a telephoto direction zoom switch SW4, a self-timer setting and canceling switch SW5, a menu switch SW6, an up direction and strobe setting switch SW7, a right direction switch SW8, a display switch SW9, a down direction and macro SW10, a left direction and image confirming switch SW11, an OK switch SW12, and a quick access switch SW13.

A system configuration of the digital camera is as follows. The digital camera is configured so that the digital camera is controlled by a digital camera processor 104 (hereinafter called processor 104) shown in FIG. 2. The processor 104 includes a CCD1 signal process block 104-1, a CCD2 signal process block 104-2, a CPU block 104-3, a local SRAM 104-4, a USB block 104-5, a serial block 104-6, a JPEG codec block 104-7, a resize block 104-8, a TV signal display block 104-9, and a memory card control block 104-10 which are connected each other by a bus, also referred to as a bus line. The digital camera includes a SDRAM 103 for storing RAW-RGB image data, YUV image data, and JPEG image data outside the processor 104. The SDRAM 103 is connected to the processor 104 by the bus line. The digital camera includes a ROM 108 storing a control program, a RAM 107, and an embedded memory 120, connected to the processor 104 by the bus line.

The camera cone 7 includes a zoom optical system 7-1 including a zoom lens 7-1a, a focus optical system 7-2 including a focus lens 7-2a, an aperture unit 7-3 including an aperture 7-3a, and a mechanical shutter unit 7-4 including a mechanical shutter 7-4a. The zoom optical system 7-1 is driven by a zoom motor 7-1b. The focus optical system 7-2 is driven by a focus motor 7-2b. The aperture unit 7-3 is driven by an aperture motor 7-3b. The mechanical shutter unit 7-4 is driven by a mechanical shutter motor 7-4b. The zoom motor 7-1b, the focus motor 7-2b, the aperture motor 7-3b, and the mechanical shutter motor 7-4b are controlled by a motor driver 7-5. The motor driver is controlled by the CPU block 104-3.

The camera cone 7 includes a photographing lens including the zoom lens 7-1a and the focus lens 7-2a focusing an image onto a CCD 101 which captures an image and is an imaging device or part of an imaging device. The CCD 101 converts the subject image into an image signal and outputs the image signal to an F/E-IC102. The F/E-IC102 includes CDS 102-1, an ADC 102-2, and an A/D converter 102-3, operates a predetermined process to the image signal, converts the image signal into a digital signal, and outputs the digital signal to the CCD1 signal process block 104-1. The predetermined process is controlled by a VD/HD signal output from the CCD1 signal process block 104-1 and via a TG 102-4. These components can be constructed in any desired manner, and are not limited to what is disclosed in FIG. 2, but any desired, known, or conventional structure can be used for obtaining the image.

The CPU block 104-3 controls a sound recording operation operated by a sound recording circuit 115-1. The sound recording circuit 115-1 records an amplified signal amplified by a microphone AMP 115-2 based on instruction. The microphone AMP 115-2 amplifies a sound signal converted by a microphone 115-3. The CPU block 104-3 controls a sound reproduction operation operated by a sound generating circuit 116-1. The sound generating circuit 116-1 reproduces a sound signal recorded on a memory based on instruction and inputs the sound signal to an audio AMP 116-2. The sound signal is output from a speaker 116-3. The CPU block 104-3 emits an illumination light from the strobe light emission part 3 by controlling a strobe light circuit 114. The CPU block 104-3 further controls the distance surveying unit 5.

The CPU block 104-3 is connected to a sub CPU 109 which controls an operation to display information at a sub VCD1 via a LCD driver 111. The sub CPU 109 is connected to AF LED 8, a strobe light LED 9, a remote control optical receiver 6, an operation key unit including the switches SW1 to 13, and a buzzer 113 which may be a speaker or any sound generator of the appropriate sound.

The USB block 104-5 is connected to a USB connector 122, and the serial block 104-6 is connected to RS-232C connector via a serial driver circuit 123-1. The TV signal display block 104-9 is connected to the LCD monitor 10 via the LCD driver 111 and connected to a video jack 119 via a video AMP 118. The memory card control block 104-10 is connected to a card contact point of a memory card socket 121.

Before operation of the digital camera according to the present invention is described, the operation of a well-known digital camera is described below. The digital camera boots up into a record mode by setting a mode dial SW2 to a record mode. When the mode dial SW2 is set, the CPU detects that a record mode is on, controls the motor driver 7-5, and transfer the camera cone 7 to a position enabling to photograph. The digital camera turns on the CCD 101, the F/E-IC 102, and the LCD. When the each element is turned on, the camera is placed in a finder mode.

In the finder mode, a light entering the CCD 101 via a lens is converted to an electric signal, and sent to the CDS 102-1 and the A/D converter 102-3 as analog signals R, G, and B. The analog signals are converted to digital signals in the A/D converter 102-3, the digital signals are converted to YUV signals in a YUV converter in the SDRAM 103, and the YUV signals are recorded on a frame memory by a memory controller. The YUV signals are read out by the memory controller, are sent to a TV or the LCD monitor 10 via the TV signal display block 104-9, and are displayed. The above process is operated at 1/30 second intervals, and the display is updated at 1/30 second intervals.

Figure 3A:
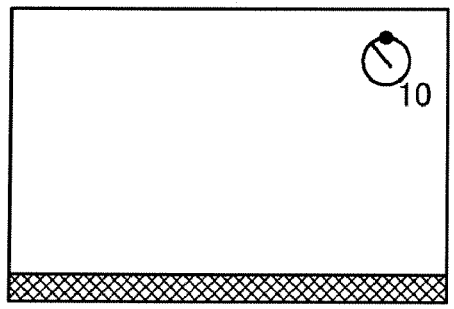
FIG. 3A is a finder image indicating a self-timer mode (10 seconds mode)
Figure 3B:
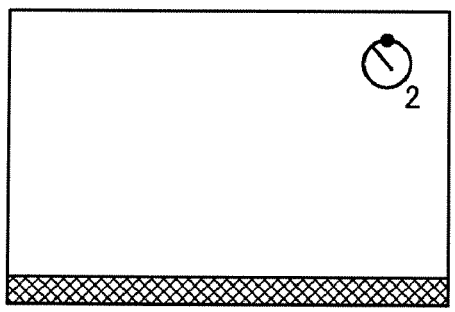
FIG. 3B is a finder image indicating a self-timer mode (2 seconds mode)
Figure 3C:
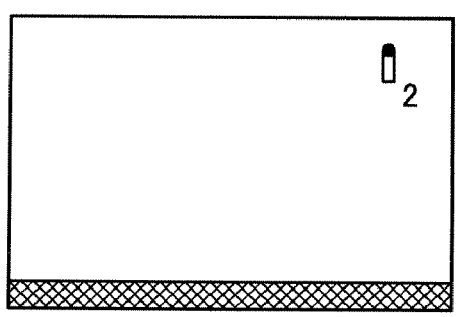
FIG. 3C is a finder image indicating a remote control mode.

In the finder mode, when the self-timer setting and canceling switch SW5 is pressed, it is possible to set a self-timer mode shown in FIG. 3. The self-timer mode has two modes; a 2 seconds mode shown in FIG. 3A, and a 10 second mode shown in FIG. 3B, the 2 second mode operates a photographing process after 2 seconds and the 10 second mode operates a photographing process after 10 seconds. The 2 second mode is switchable to a remote control mode shown in FIG. 3C. When the remote control optical receiver 6 receives a signal from a remote controller, it is possible to start photographing after 2 seconds, or immediately, if desired An AF (auto focus) system and an AE (auto exposure) system in the digital camera according to the present invention are described below. It assumed that the AF is a function of focusing a camera automatically (auto focusing function), and the AE mode determines an exposure (a combination of an aperture value, a shutter speed, and an ISO sensitivity) of a camera automatically (auto exposure function).

When the release switch SW1 is pressed, an AF evaluated value indicating a level of focusing in a screen and an AE evaluated value indicating an exposure condition is calculated based on a digital RGB signal imported in a CCD and I/F block of a signal processing IC. An AF evaluated value data is read out by a microcomputer as a characteristic data and used on an AF process. The AF evaluated value data is an integration value and a high-frequency component of the integration value is highest since a edge part of a subject become clear in the case of focusing condition. During the AF process, the digital camera obtains the AF evaluated value at each focusing lens position and detects a maximum, or maxima, ((a) peak position(s)) with the above characteristics. When the AF evaluated value has a plenty of maxima or the largest number of peak positions, the digital camera adopts a most reliable point as a focusing point based on the amplitude of the AF evaluated value at a peak position and a degree of appreciation and declination from a neighborhood value.

Figure 4:
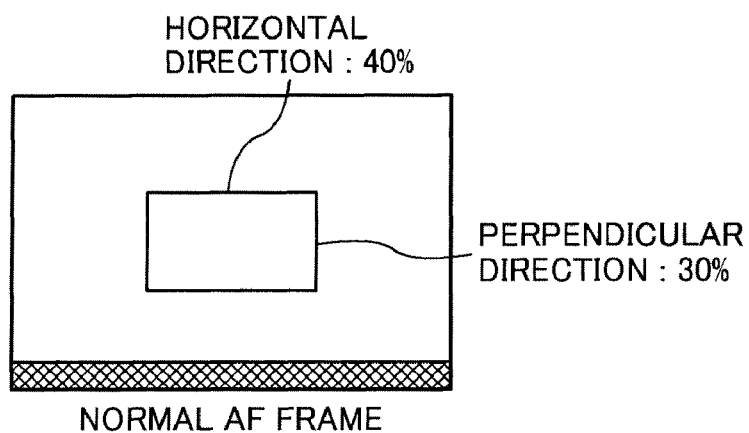
FIG. 4 shows a normal AF frame in the imaging pickup device.
Figure 5A:
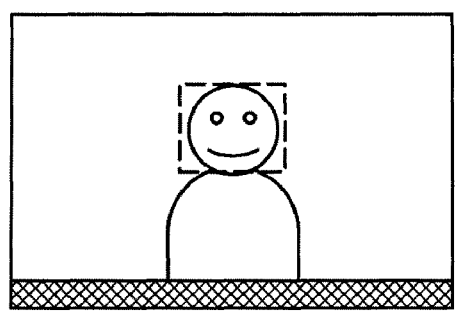
FIGS. 5A and 5B show an AF area in the imaging pickup device in the case of succeeding a facial recognition.
Figure 5B:
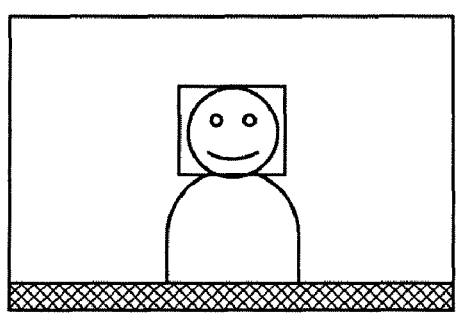

The AF evaluated value is calculated from a predetermined range of the digital RGB signal. FIG. 4 shows the predetermined range, which is displayed at the LCD 10 in the finder mode. A center frame of FIG. 4 is the predetermined range. Here the predetermined range is 40% of a horizontal direction and 30% of a perpendicular direction of the digital RGB signal. When a facial recognition function can recognize a face, the predetermined area corresponds to the face shown in FIG. 5. Even if the digital RGB signal includes multiple faces, the digital camera detects the multiple faces. The digital camera detects up to 4 faces, although more or less faces may be detected, as desired.

The digital camera divides the digital RGB signal into plural areas, for example 16×16 shown in FIG. 6, and uses brightness data of the plural areas for calculating the AE evaluated value. The digital camera selects several pixels having a brightness value more than a threshold value from the plural areas as a subject pixel, adds up selected brightness values, and multiplies a number of the subject pixels. The digital camera calculates applicable exposure based on a brightness distribution of each area, and amends exposure based on the brightness distribution. Here, for example, when using a facial recognition function, the digital camera selects neighboring areas of an area included in facial recognition area as a subject area, and uses brightness data of the neighboring areas. If the digital RGB signal includes multiple faces, the digital camera selects neighboring areas of an area included in each facial recognition area as a subject area.

The digital camera includes the facial recognition function for the AF process and AE process. The facial recognition function is described below. A facial recognition mode of the digital camera is selected by the menu switch SW6, and may be registered or set using the quick access switch SW13. During the facial recognition mode, the digital camera periodically performs a facial recognition. A method of detecting a face from a subject image in the facial recognition function is well known and the present invention uses any one of methods below, or any other desired method:

"A Proposal of the Modified HSV Colour System Suitable for Human Face Extraction" vol. 49, No. 6, p. 787-797, 1995. The Journal of the Institute of Television Engineers of Japan, discloses a method that converts a color image into a mosaic image, and picks out a facial area by focusing attention on a flesh color area.

"A Method of picking out a facial area from a still shading scene image" vol. 74-D-II, No. 11, p. 1625-1627, 1991, The Journal of the Institute of Electronics, Information and Communication Engineers, discloses that a method picks up a head region of a front face by using a geometric aspect regarding each part of the head region such as eyes, a mouth, hair and so on.

"A detection of a facial area for a TV telephone and an effect of the detection" 1991-11, 1991, The GAZOH RABO, the image laboratory, discloses that a method picks up a front face by using a contour of a subject person generated by moving an microscopical motion between frames of a moving image.

Figure 8:
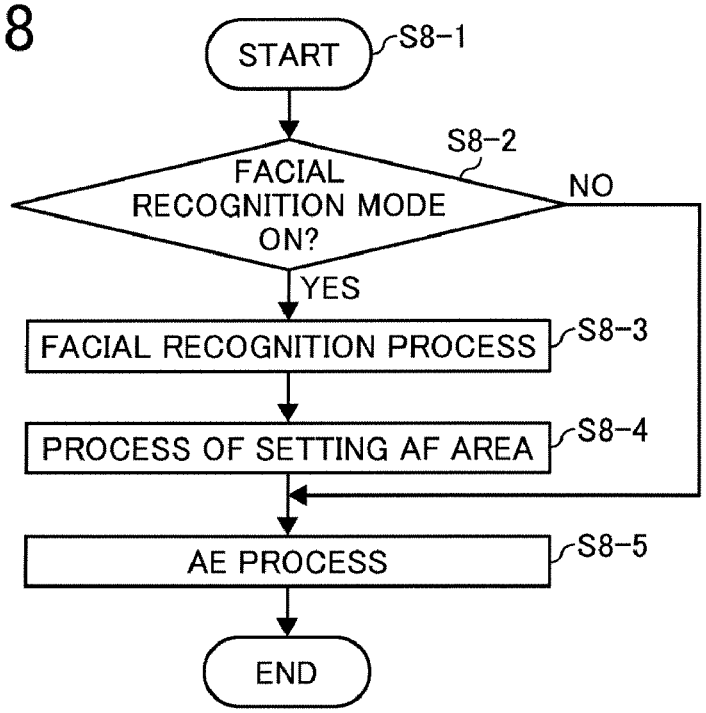
FIG. 8 is a flowchart showing the operation of the invention.

Next an operation of the digital camera in the first embodiment is described below. The facial recognition process in the finder mode is described below with respect to FIG. 8.

Since the finder mode is updated at 1/30 second intervals, the facial recognition process is operated so that the facial recognition process is synchronized with the finder mode. In the first step S8-1, the digital camera starts a flow for the facial recognition process. In the next step S8-2, the digital camera confirms whether the facial recognition mode is set or not. In the case that the facial recognition mode is set, flow proceeds to step S8-3, in which the digital camera performs a facial recognition process. In the next step S8-4, the digital camera sets an AF area based on a result of facial recognition process corresponding to a detected facial area shown in FIG. 5. When the digital camera does not complete the facial recognition process, the digital camera sets a normal AF area as the AF area. In the next step S8-5, the digital camera sets a whole area the same as a normal photographing (not the facial recognition mode) because an exposure in a finder changes depending on whether the facial recognition process is completed or not.

In the case that the facial recognition mode is not set, in the next step S8-5, the digital camera operates the AE process and the process ends. In the case of multiple subjects, peaks of the AF evaluated values may not lap over each, as shown in FIG.

Figure 9A:
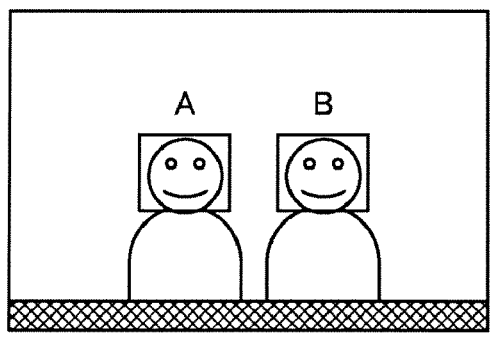
FIG. 9A shows a finder image in the case of recognition two facial areas according to the present invention.
Figure 9B:
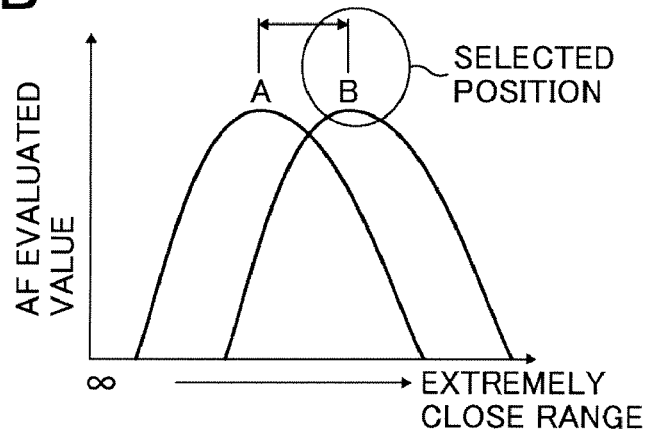
FIG. 9B shows an AF evaluated value characteristics in the case of recognition two facial areas according to the present invention.

9B, when the facial recognition mode is operated in a situation shown in FIG. 9A. In the above case, the digital camera selects the nearer peak, for example B of FIG. 9B.

Figure 9C:
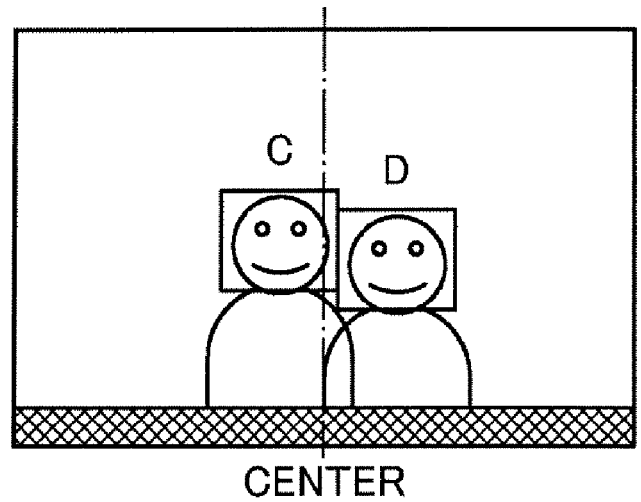
FIG. 9C shows a finder image for two people who are close to each other.
Figure 9D:
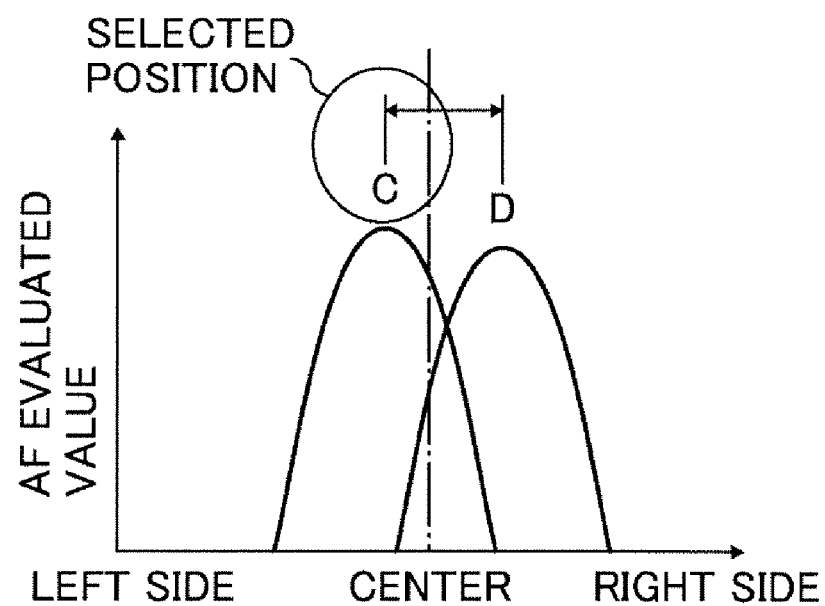
FIG. 9D shows AF evaluated characteristic of the image of FIG. 9C.

FIGS. 9C and 9D illustrate the selection of a face in a situation in which multiple faces are detected. In this case, the face which is more in the center of the image is the face that is chosen. In FIG. 9C, there are illustrated faces C and D, which are a plurality of people. In this figure, it is seen that the face C is more towards a center than the face D.

In FIG. 9D, there is shown an AF evaluated value which shows that the graph for face C is more towards the center of the picture as compared to the AF evaluated value for face D. Thus, if the face towards the center is selected for focusing and/or automatic exposure determination, the face C will be the chosen face. In FIG. 9D, the graph shows an AF evaluated value for the Y axis. However, it is not necessary to use such an AF evaluated value but other values may be used to determine that the face is in the center of thy picture. For example, if the face recognition process determines that the face is in the center, then that face and that facial recognition process may be used to select the AF or the AE settings.

Figure 10:
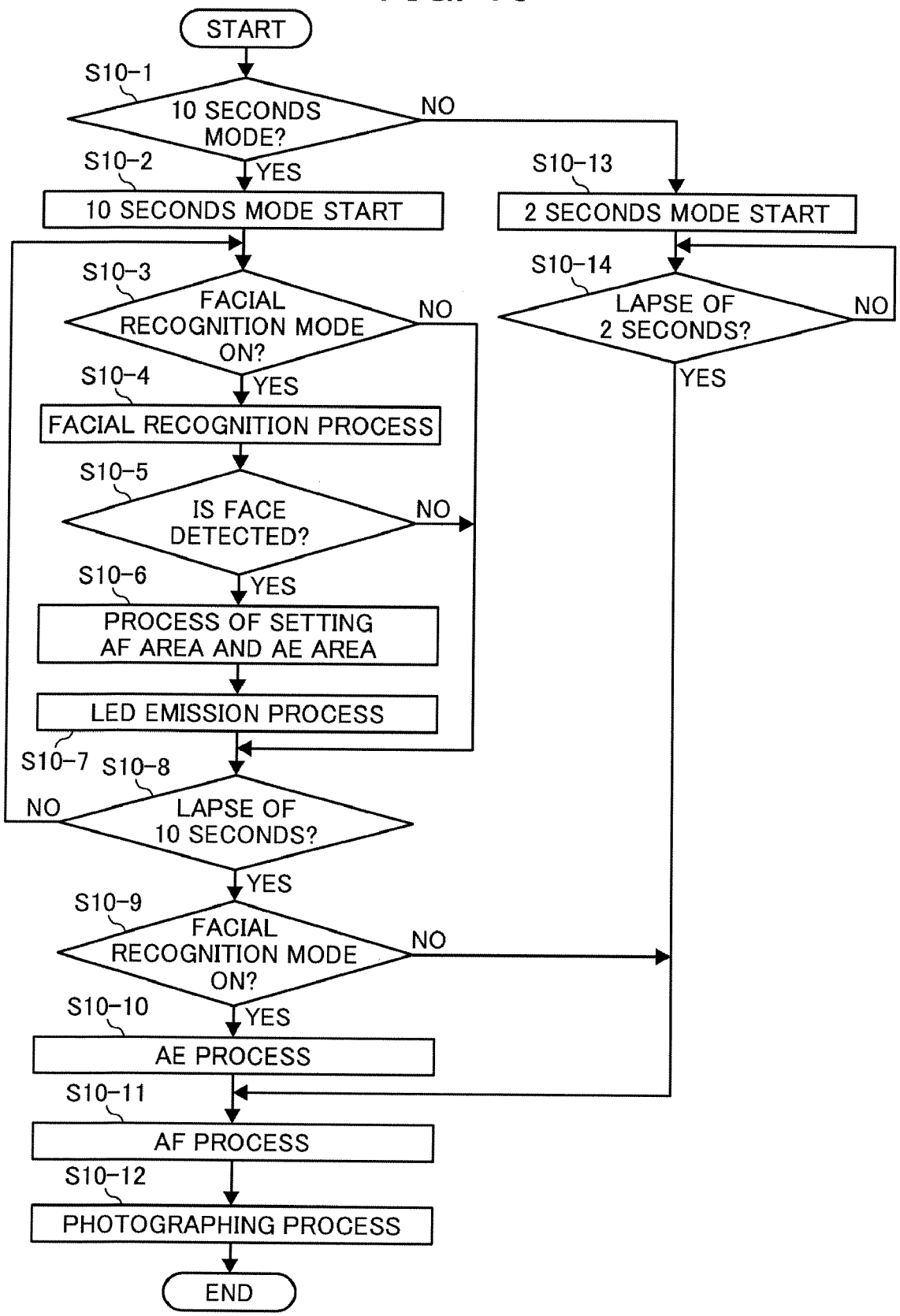
FIG. 10 is a flowchart showing a photographing supplementary process in the case of operating a self-timer photographing according to a first embodiment.

The use of the self-timer mode is described below with respect to FIG. 10.

In the first step S10-1, the digital camera judges whether the self-timer mode is the 2 second mode or the 10 second mode. In next step S10-13, since the 2 second mode is used for stabilizing images on a tripod and since it is assumed that the subject image is in the finder image, the facial recognition process is not operated. In the next step S10-14, the digital camera judges that 2 seconds has passed. In the next step S10-11, the digital camera operates the AF process. In the next step S10-12, the digital camera operates the photographing process and the self-timer photographing ends.

In the case that the self-timer mode is the 10 second mode, in the next step S10-2, the digital camera starts the 10 second mode. In the next step S10-3, the digital camera judges whether or not the facial recognition mode is on. In the case that the facial recognition mode is on, in the next step S10-4, the digital camera operates the facial recognition process for 10 seconds, for example. In the next step 510-5, the digital camera judges whether a face has been detected. In the case that a face has been detected, step S10-6 sets the AF area and the AE area based on the facial area. In the next step S10-7, the digital camera illuminates the AF fill light LED when the facial recognition process is complete so that the subject person recognizes when the facial recognition process is completed. This is because the subject persons include a photographer generally in the self-timer mode. In the next step S10-8, the digital camera judges that 10 seconds has passed. The digital camera may illuminate the flash instead of the AF fill light LED. Further, instead of turning on a light to indicate that the facial recognition process is complete, a light may be turned off to indicate the process is complete.

In the next step S10-9, the digital camera judges whether the facial recognition mode is on or not. In the case that the facial recognition mode is on, step S-10 operates the AE process based on the facial area and resolves the exposure (the aperture value, the shutter speed, and the ISO sensitivity). In the next step S10-11, the digital camera operates the AF process based on the facial area. In the case that the facial recognition mode is not on, the digital camera skips the step S10-10. Finally, in step S10-12, the digital camera operates the photograph process and records a still image based on the above result. The process of FIG. 10 then ends.

As described above, the digital camera according to the first embodiment does not need to estimate a focus position at the time of photographing, operate a pre-focus process (a distance surveying process which occurs by pressing release button halfway on commonly-used cameras), or start the self-timer mode when pressing the release halfway. In sum, the digital camera avoids troublesome operations and the digital camera starts the self-timer mode facing a suitable direction. The digital camera obtains a photographing result, which focuses a subject face and has a suitable exposure even when the photographer is a subject person and the digital camera reoperates the photographing process quickly because the digital camera detects a face area of a subject person, and operates the AF process and AE process based on the face area for 10 seconds (2 seconds) after the self-timer mode starts. The present invention including this and other embodiments allows a good and quick result using facial detection when the photographer is the only person in the picture as the facial detection process may operate from when a photographing command is received until the photographer can get into the picture. Then, when the delay period is up, a photograph can be taken using the AF and/or AE data obtained during the delay time period based on facial recognition.

Next an operation of the digital camera of the second embodiment is described below, using the same reference symbols as in the first embodiment for the same or equivalent parts as in the first embodiment, and descriptions of the same parts may be omitted.

Figure 11A:
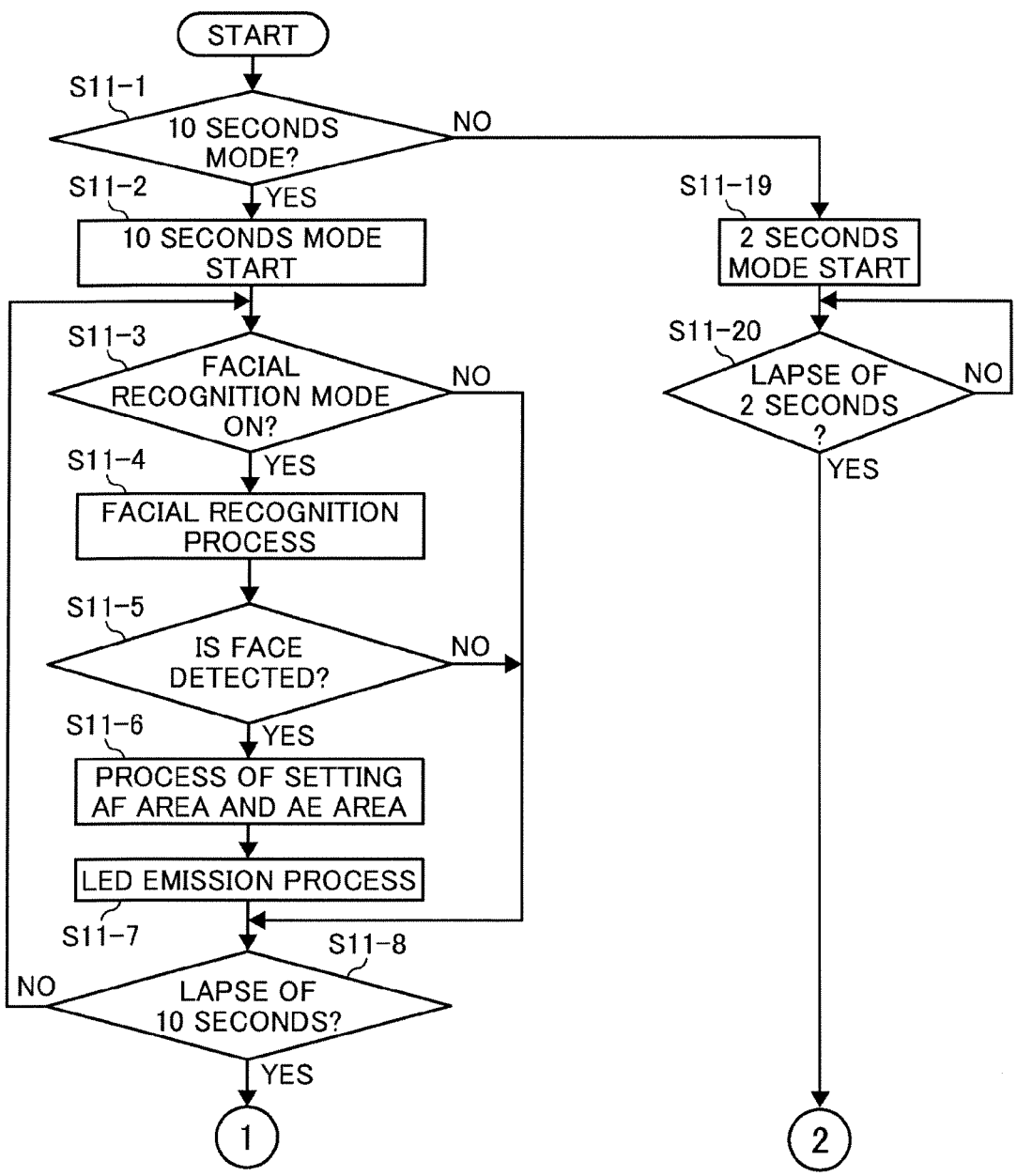
FIGS. 11A and 11B are a flowchart showing a photographing supplementary process in the case of operating a self-timer photographing according to a first embodiment.
Figure 11B:
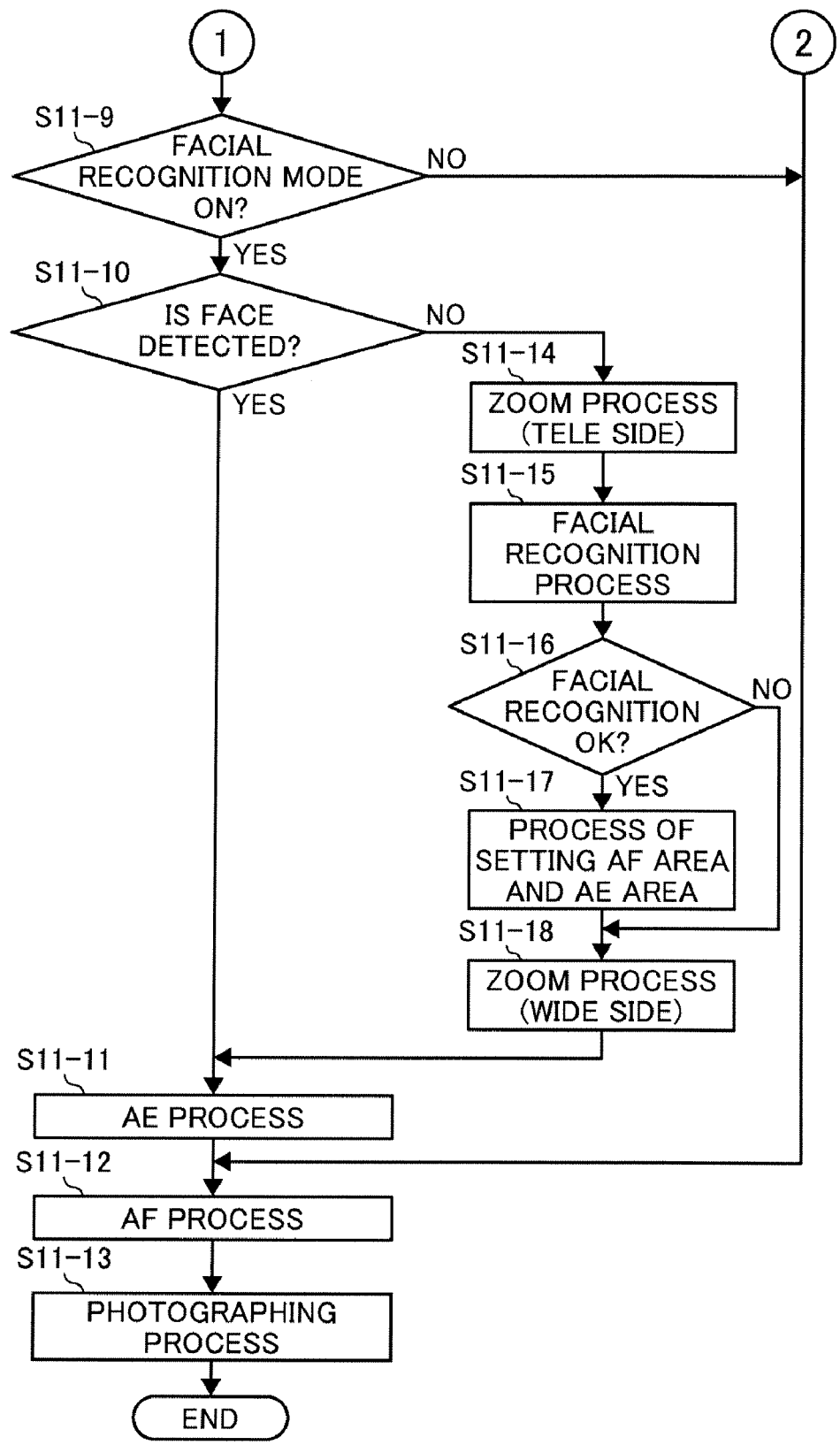

The self-timer photographing is described below with respect to FIG. 11.

In the first step S11-1, the digital camera judges whether the self-timer mode is in the 2 second mode or the 10 second mode. When the self-timer is not in the 10 second mode, flow proceeds to step S11-19. The 2 second mode is used for stabilizing images when using a tripod and since it is assumed that the subject image is in the finder image, the facial recognition process is not operated. In the next step S11-20, the digital camera judges that 2 seconds have passed. In the next step S11-12, the digital camera operates the AF process. Finally, in step S11-13, the digital camera operates the photographing process and the self-timer photographing ends.

In the case that the self-timer mode is the 10 second mode, in the next step S11-2, the digital camera starts the 10 second mode. In the next step S11-3, the digital camera judges whether the facial recognition mode is on or not. When the facial recognition mode is not on, flow proceeds to step S11-8. In the case that the facial recognition mode is on, in the next step S11-4, the digital camera operates the facial recognition process for 10 seconds. In the next step S11-5, the digital camera judges whether a face has been detected. When a face has been detected, flow proceeds to step S11-6 in which the AF area and the AE area are set based on the facial area. In the next step S11-7, the digital camera illuminates the AF fill light LED to indicate that the facial recognition process is complete and this LED can be seen by the subject person. This is because the subject persons include a photographer generally in the self-timer mode. In the next step S11-8, the digital camera judges that 10 seconds have passed. The digital camera may illuminate a strobe light or lamp instead of the AF fill light LED.

In the next step S11-9, the digital camera judges whether the facial recognition mode is on or not. In the case that the facial recognition mode is on, in the next step S11-10, the digital camera judges whether a face has been detected. In the case that the facial recognition process is completed and a face has been detected, in the next step S11-11, the digital camera operates the AE process based on the facial area and resolves the exposure (the aperture value, the shutter speed, and the ISO sensitivity). In the next step S11-12, the digital camera operates the AF process based on the facial area.

When the facial recognition mode is not on, the digital camera skips the steps S11-10 and S11-11.

Figure 12A:
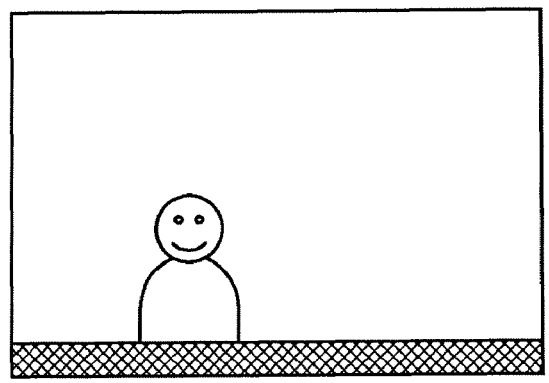
FIG. 12A shows an angle of view for photographing according to a second embodiment.
Figure 12B:
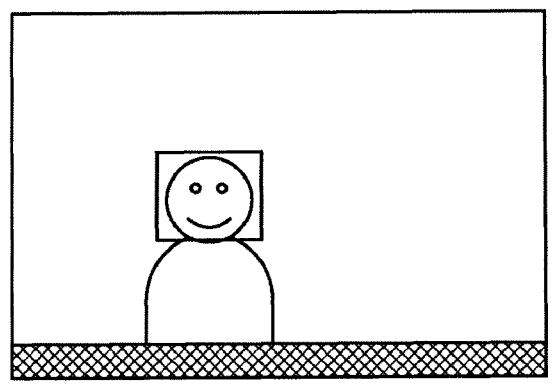
FIG. 12B shows a zoom angle of view for a re-recognizing a facial area according to a second embodiment.
Figure 12C:
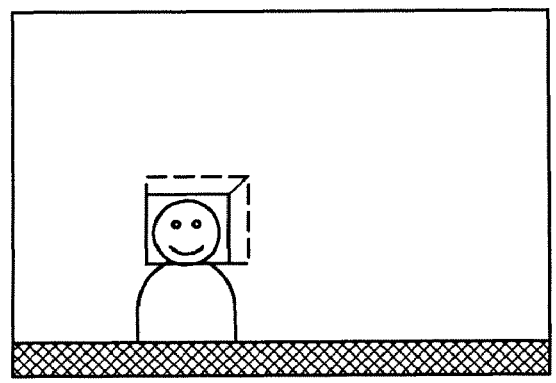
FIG. 12C shows the angle of view for photographing after re-recognizing a facial area according to a second embodiment.

In the case that a face has not been detected in step S11-10, the digital camera operates the facial recognition process again after the digital camera changes an angle of view (e.g., whether the lens is zoomed in or out). Hereinafter, an angle of view before being changed is a first angle of view, and an angle of view after being changed is a second angle of view. In the case that the face of the subject person is so small that the digital camera cannot operate the facial recognition process shown in FIG. 12A, step S11-10 determines that no face is detected and flow proceeds to step S11-14. In step S11-14, the digital camera operates a zoom process shown in FIG. 12B in order to place the lens in more of a telephoto mode. In the next step S11-15, the digital camera operates the facial recognition process at the second angle of view (e.g., zoomed in). It is desirable that a difference between the first angle of view and the second angle of view be small because there is no guarantee that the subject person is in a center of the finder image although the difference can be big, if desired. For example the digital camera zooms in 1.25 times compared with a present focal length or setting. In the next step S11-16, the digital camera judges whether the facial recognition mode is completed or not (e.g., a face is detected). In the case that the facial recognition process is completed and a face has been detected, in the next step S11-17 the digital camera sets the AF area and the AE area so that the AF area and the AE area to correspond to the first angle of view. In the next step S11-18, the digital camera zooms back to the first angle of view shown in FIG. 12C. The digital camera operates the facial recognition process even under an environment that it is difficult to operate the facial recognition process on by zooming in from the first angle of view, operating the facial recognition process, and zooming back out to the first angle of view. From step S11-18, flow proceeds to steps S11-11 and S11-12 which have already been described.

In the next step S11-13, the digital camera operates the photograph process and records an image or images, such as a still image based on above result.

As described above, the digital camera according to the second embodiment does not need to estimate a focus position at the time of photographing, operate a pre-focus process (a distance surveying process which occurs by pressing release button halfway on commonly-used cameras), or start the self-timer mode when pressing the release halfway. In sum, the digital camera avoids troublesome operations and the digital camera starts the self-timer mode facing a suitable direction. The digital camera obtains a photographing result, which focuses a subject face and has a suitable exposure even when the photographer is a subject person and the digital camera reoperates the photographing process quickly because the digital camera detects a face area of a subject person, and operates the AF process and AE process based on the face area for 10 seconds (2 seconds) after the self-timer mode starts. The present invention including this and other embodiments allows a good and quick result using facial detection when the photographer is the only person in the picture as the facial detection process may operate from when a photographing command is received until the photographer can get into the picture. Then, when the delay period is up, a photograph can be taken using the AF and/or AE data obtained during the delay time period based on facial recognition.

Further, the digital camera operates the facial recognition process even in an environment where it is difficult to operate the facial recognition process by zooming in, operating the facial recognition process, and zooming back out to the original focal position, in the case that the face of the subject person is so small that the digital camera cannot operate the facial recognition process.

An operation of the digital camera in the third embodiment is described below, using the same reference symbols as in the first embodiment shown in FIGS. 1 to 7 for the same or equivalent parts as in the first embodiment, and descriptions of the same parts may be omitted. In this embodiment, the facial recognition process uses the finder mode, as described above. Since the finder mode is updated at 1/30 seconds intervals, the facial recognition process is operated so that the facial recognition process is synchronized with the finder mode.

Figure 13:
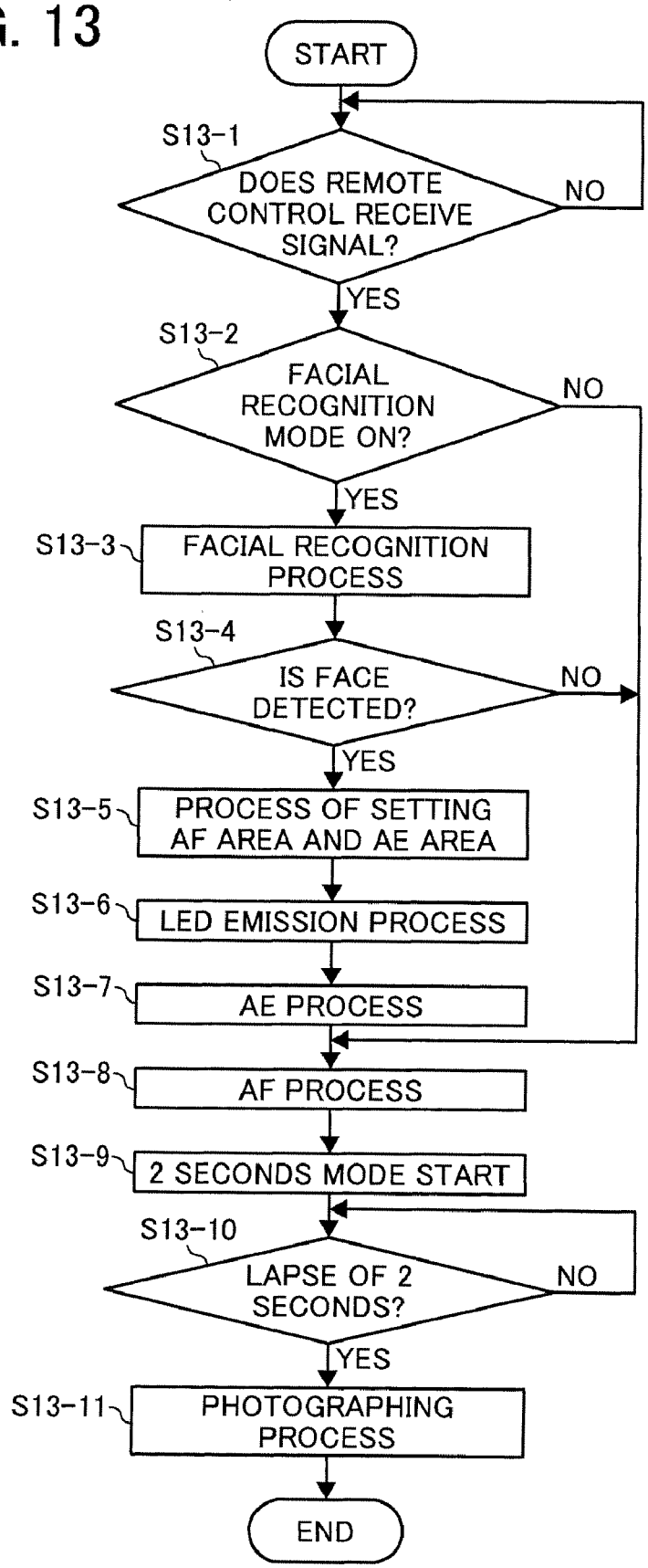
FIG. 13 is a flowchart showing a photographing supplementary process in the case of operating a self-timer photographing according to a first embodiment.

A remote control photographing is described below with respect to FIG. 13. After starting, step S13-1 judges whether a remote control is operated or not, (e.g., whether the remote control optical receiver 6 receives a signal or not). Other receivers such as radio frequency, ultrasonic, or any other type may be used, if desired. In the case that the remote control receiver 6 receives the signal, in the next step S13-2, the digital camera judges whether the facial recognition mode is on or not. In the case that the facial recognition mode is on, flow proceeds to step S13-3 in which the digital camera performs the facial recognition process. In the case that the facial recognition process detects a face in step S13-4, flow proceeds to step S13-5 which sets the AF area and the AE area based on the facial area. In the next step S13-6, the digital camera illuminates the AF fill light LED to indicate the facial recognition process is complete to the subject person as the subject persons usually include the photographer in the remote control mode. The digital camera may alternatively, illuminate a strobe light or lamp instead of the AF fill light LED. In the next step S13-7, the digital camera operates the AE process based on the facial area and resolves the exposure (the aperture value, the shutter speed, and the ISO sensitivity). In the next step S13-8, the digital camera operates the AF process based on the facial area.

In the next step S13-9, the digital camera starts a 2 seconds timer. In the next step S13-10, the digital camera judges whether 2 seconds has passed or not. After 2 seconds have passed, in the next step S13-11, the digital camera operates the photograph process and records a still image based on above result. The process then ends. As an alternative to the 2 second lapse occurring after the facial recognition process, the facial recognition process can occur during the 2 second delay period.

As described above, the digital camera according to the third embodiment does not need to estimate a focus position at the time of photographing, operate a pre-focus process (a distance surveying process which occurs by pressing release button halfway on commonly-used cameras), or start the self-timer mode when pressing the release halfway. In sum, the digital camera avoids troublesome operations and the digital camera starts the self-timer mode facing a suitable direction. The digital camera obtains a photographing result, which focuses a subject face and has a suitable exposure even when the photographer is a subject person and the digital camera reoperates the photographing process quickly because the digital camera detects a face area of a subject person, and operates the AF process and AE process based on the face area for 10 seconds (2 seconds) after the self-timer mode starts. The present invention including this and other embodiments allows a good and quick result using facial detection when the photographer is the only person in the picture as the facial detection process may operate from when a photographing command is received until the photographer can get into the picture. Then, when the delay period is up, a photograph can be taken using the AF and/or AE data obtained during the delay time period based on facial recognition.

The present invention is described based on the first, second and third embodiments. However concrete elements are not limited by these embodiments.

These embodiments operate the AF process and the AE process based on the facial recognition process in the self-timer mode or the remote control mode. However, the present invention may operate using any one of the AF process and the AE process. The present invention may change a set value regarding photographing other than the AF evaluated value and the AE evaluated value. In sum, the present invention operates the facial recognition process during a delay time of the self-timer mode or the remote control mode and changes the set value regarding photographing based on a result of the facial recognition process.

These embodiments select the closest facial area as the AF area and the AE area in the case that that subjects are multiple. However the present invention may select the facial area closest to a center.

These embodiments use an illuminated AF fill light LED to indicate that the facial recognition process is complete. However the present invention may illuminate the AF fill light LED when the facial recognition process is not completed.

Obviously, numerous additional modifications and variations of the present invention are possible in light of the above teachings. It is therefore to be understood that within the scope of the appended claims, the present invention may be practiced otherwise than as specifically described herein.

What is claimed is:

1. An imaging apparatus, comprising:
a face detector configured to detect a face of a person being photographed;
a timer configured to delay a time an instruction is provided until an image is photographed; and
a controller configured to operate the face detector during the time in which there is the delay and to change photographing parameters prior to photographing using a result of the face detector,
wherein the controller commands a change in the field of view and a face recognition, when an original field of view does not result in face detection.

2. The imaging apparatus according to claim 1, wherein:
the controller sets at least one area of an automatic focus object area and an automatic exposure object area using the result of the face detector.

3. The imaging apparatus according to claim 1, further comprising:
an indicator configured to indicate a result of the face detector to a subject being photographed.

4. The imaging apparatus according to claim 1, wherein:
the controller sets a nearest facial area as an automatic focus area or an automatic exposure area when in the face detector detects multiple faces.

5. The imaging apparatus according to claim 1, wherein:
the controller sets a facial area closest to a center of an image as an automatic focus area or an automatic exposure area when the face detector detects multiple faces.

6. The imaging apparatus according to claim 1, further comprising:
a shutter release which is used to generate the instruction.

7. An imaging apparatus according to claim 1, further comprising:
a receiver; and
a transmitter, separate from the imaging apparatus, configured to send a signal to the receiver to indicate the instruction.

8. The imaging apparatus according to claim 7, wherein:
the controller sets at least one area of an automatic focus object area and an automatic exposure object area using the result of the face detector.

9. The imaging apparatus according to claim 7, further comprising:
an indicator configured to indicate a result of the face detector to a subject being photographed.

10. The imaging apparatus according to claim 7, wherein:
the controller commands a change in the field of view and a face recognition, when an original field of view does not result in face detection.

11. The imaging apparatus according to claim 7, wherein:
the controller sets a nearest facial area as an automatic focus area or an automatic exposure area when in the face detector detects multiple faces.

12. The imaging apparatus according to claim 7, wherein:
the controller sets a facial area closest to a center of an image as an automatic focus area or an automatic exposure area when the face detector detects multiple faces.

13. A method of capturing an image, comprising:
receiving an instruction to capture an image;
running a timer which delays a start of the capture of the image;
performing a face detection of a person being photographed while running the timer;
setting an image capture parameter using a result of the face detection, when the face detection is successful;
capturing the image after the delay caused by the timer using the image capture parameter which has been set, when the face detection is successful;
commanding, when the face detection is not successful, a change in a field of view and performing the face detection again using the changed field of view; and
changing, when the face detection is not successful, the field of view back to an original field of view.

14. A method according to claim 13, wherein the setting comprises:
setting at least one area of an automatic focus object area and an automatic exposure object area as the image capture parameter using the result of the face detector.

15. A method according to claim 13, further comprising:
using a light indicator to indicate a result of the face detection.

16. A method according to claim 13, wherein:
the face detection sets a nearest facial area as an automatic focus area or an automatic exposure area when multiple faces are detected.

17. A method according to claim 13, wherein:
the face detection sets a facial area closest to a center of an image as an automatic focus area or an automatic exposure area when multiple faces are detected.

18. A method according to claim 13, wherein the receiving comprises:
receiving a command to capture the image from a remote control.

19. An imaging apparatus, comprising:
a face detector configured to detect a face of a person being photographed;
a timer configured to delay a time an instruction is provided until an image is photographed;
a controller configured to operate the face detector during the time in which there is the delay and to change photographing parameters prior to photographing using a result of the face detector;
a receiver; and
a transmitter, separate from the imaging apparatus, configured to send a signal to the receiver to indicate the instruction,
wherein the controller commands a change in the field of view and a face recognition, when an original field of view does not result in face detection.

* * * * *